UNITED STATES PATENT OFFICE.

CHEAELS L. ROBINSON, OF SAN FRANCISCO, CALIFORNIA.

REMEDY FOR AGUE.

SPECIFICATION forming part of Letters Patent No. 275,524, dated April 10, 1883.

Application filed June 12, 1882. (No specimens.)

*To all whom it may concern:*

Be it known that I, CHEAELS L. ROBINSON, a citizen of the United States, residing at the city and county of San Francisco, State of California, have invented a new and useful Medical Compound, to be used in cases of fever and ague, of which the following is a specification.

My compound consists of the following ingredients combined in the proportions stated—viz: a mixture of six ounces of olive-oil and milk in equal proportions, reduced one-third, by boiling, to four ounces; flowers of arnica, one ounce; spirits of lavender, one-half ounce; essence Jamaica ginger, one-half ounce. These ingredients are placed in a bottle, and are thoroughly mingled by agitation.

This compound is good as medicine in cases of fever and ague. It is to be taken internally. Directions for using it are, one table-spoonful upon the first symptom of the chill, and to be repeated upon any recurrence of the ague.

The particular utility of each ingredient is as follows: Olive-oil and red lavender act on the liver. Arnica is healing. Jamaica ginger is a tonic; and the milk renders the whole more palatable.

The object in boiling the mixture of oil and milk is to preserve it by keeping it from becoming sour, and my reason for reducing it is to strengthen it.

Having thus described my invention, what I claim as new, and desire to secure by Letters Patent, is—

The herein-described medical compound for fever and ague, consisting of olive-oil, milk, flowers of arnica, spirits of red lavender, and essence of Jamaica ginger, substantially in the proportions specified.

It witness whereof I hereunto set my hand.

CHEAELS L. ROBINSON.

Witnesses:
C. D. COLE,
J. H. BLOOD.